June 24, 1930.  A. M. PATTERSON  1,766,351
FABRIC FLOWER AND METHOD OF MAKING THE SAME
Filed May 23, 1928
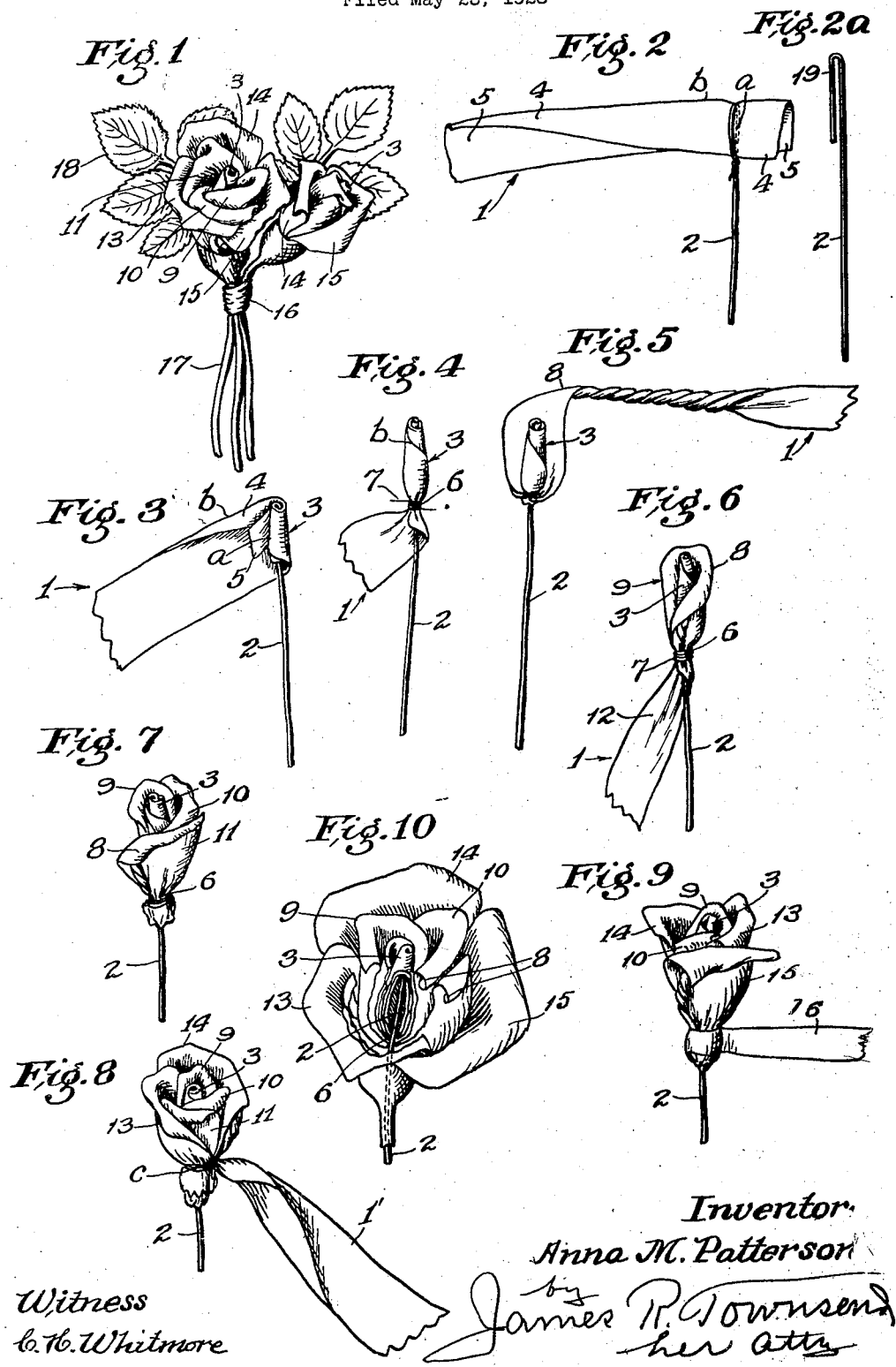
Witness
C. H. Whitmore
Inventor:
Anna M. Patterson
by James R. Townsend
her atty.

Patented June 24, 1930

1,766,351

UNITED STATES PATENT OFFICE

ANNA M. PATTERSON, OF LONG BEACH, CALIFORNIA

FABRIC FLOWER AND METHOD OF MAKING THE SAME

Application filed May 23, 1928. Serial No. 279,923.

I have discovered that a high degree of resiliency may be given a petal formed of satin ribbon by reinforcing thereon a twist that will curl the edge of the petal, and then fixing the form by binding the root of the petal to a stem.

An object of the invention is to provide a lasting artificial flower of natural appearance.

In carrying out the invention I preferably use ribbons of satin, but it is understood that other ribbons and strips of fabric may be used for varying effects in producing different flowers.

The invention is broadly new, basic and pioneer in that each petal of the flower is provided with an outwardly rolled edge that is held in place by an extension of such edge tightly rolled to form a support for the petal and the supporting roll is tied in place on a stem element which is preferably formed of wire.

An object of the invention is to provide an artificial flower made of a strip of material which will hold its form with rough usage without the aid of adhesives or wired edges.

An advantage arising from this invention is the production of an artificial flower having a particularly natural and a highly attractive appearance and having a resilient character that is adapted to restore the flower so it will not appear crushed after being subjected to and freed from pressure or severe usage.

Although the material from which the flowers can be formed may be of various characters, I prefer to make the flowers of satin ribbon having selvage edges and having a satin finish on one side only, so that in the completed flower the opposite sides of the petal will have different appearances, thus making the flower look more natural and real.

In practice I prefer to make the main portion of the flower with a single ribbon of one color and to use a ribbon of a harmonizing color to form the outer or encasing petals.

The method is applicable for producing the petals of various flowers, as pansies, violets, sweetpeas and numerous other flowers and blossoms to accord with the artistic sense of the maker.

Other objects, advantages and features of invention may appear from the accompanying drawing, the subjoined detailed description and the appended claims.

The invention and discovery as applied in the production of various kinds of flowers will be understood from the following description of the same as applied in the manufacture of an artificial rose-bud boutonnière.

The accompanying drawing illustrates such manufacture with a piece of wire, some fine thread and a satin ribbon fragmentally shown.

Figure 1 is a view of a finished rose and bud made in accordance with this invention and assembled with leaf sprays.

Fig. 2 shows a fragment of ribbon at the initial step with the ribbon folded diagonally at one end, and the wire stem hooked over and twisted on the fold.

Fig. 2$^a$ shows one of the wire stems bent to hook form ready for application.

Fig. 3 illustrates a second step in the manufacture.

Fig. 4 represents a further step and is a view of the heart roll formed at one end of the ribbon and tied onto the wire stem.

Fig. 5 shows the ribbon bent up from the form of Fig. 4 and twisted toward effecting the formation of the curled edge of an enclosing petal.

Fig. 6 is a view showing an enclosing petal formed from the same ribbon and tied in place on the heart roll shown in Figs. 4 and 5.

Fig. 7 is a view of a bud center having the appearance of three petals on the heart.

Fig. 8 is a view of a bud more nearly complete.

Fig. 9 is a view of a full complement of petals to form a complete rose-bud.

Fig. 10 is an enlarged detail to illustrate the finishing in the form shown in Fig. 1, broken to show interior parts.

The strip 1 is preferably a silk ribbon, satin finished on one side and of an appropriate width and color to produce the desired petals.

2 is a wire to form the stem and afford a permanent attachment to the strip that is to form the petals. The heart 3 of the bud comprises a fold formed of the plies 4 and 5 of the strip, resulting from folding the end of the ribbon diagonally lengthwise and then bending the two plies of the fold and bringing them together to form a nucleus *a* for the heart. The adjacent portion of the ribbon is then wound around such nucleus and is twisted around the wire with the folded edge *b* away from the stem and then is drawn in to a narrow neck 6 at the stem and secured by a thread 7 tightly wound around the neck and then the strip of ribbon is bent up to start the form of the first petal around the heart and is then twisted outward, as shown in Fig. 5, so as to curl the selvage edge outwardly from the heart to form a roll 8 at the outer edge of the petal as shown in Fig. 6. This may be effected by twisting the ribbon about nine turns more or less, so that a permanent curl 8 is given to the edge of the petal and this may be effected whether the petal is more or less erect and resilient, depending upon the number of turns. I sometimes only give a twist of seven turns and sometimes as high as twelve turns; the greater number of turns, giving a more pointed effect, is imposed on the petal when the closer form of bud is made.

The method of forming the next petal 9 is substantially that just described; and after each petal is formed the ribbon is bent to the neck and is closely wound with thread 7 to bind it to the neck of the preceding petal.

Fig. 7 is shown formed with three of the outside or encasing petals 9, 10 and 11, and in Fig. 6 a portion 12 of the ribbon of which said petals are made is shown ready to be twisted and fastened by the thread to form the second encasing petal 10. The heart 3 and inside enclosing petals 9, 10 and 11 are preferably of a deeper shade of ribbon than the outside or remaining petals and the strip 12 is therefore trimmed off after the petal is thoroughly wound to form a foundation for the calyx; the remaining petals 13, 14 and 15 are then formed in like manner to the petals 9, 10 and 11, the end of strip 1' having been securely attached to the neck 6 by the winding thread 7. In the final finish, the end of the strip is brought to the neck and secured by a winding *c* of thread.

It is thus seen that the petals are secured to each other and to the wire by simple windings of thread which may be of silk or any other desired character. When the bud or other blossom has thus been formed, the neck will be wrapped with a suitable finish which in the instance shown is gum tissue 16 wound around the neck and brought down to taper form and to the wire of the stem 2. Then the wire may be encased in the usual way as for instance by the rubber tubing 17.

A cluster or bouquet of roses thus formed, may be finished by artificial greens as ferns and leaves as indicated by the artificial rose leaves 18, shown in Fig. 1.

The workman will at the outset be supplied with a requisite number of wires 2 having a hook 19 as shown in Fig. 2ª, and the work is thus facilitated as the folding of the ribbon and hooking of the wire on the folded edge is easily done without delay.

I claim:—

1. An artificial flower comprising a pointed, tight-rolled center and having a petal composed of a strip having a twisted portion forming a neck and a curled edge.

2. An artificial flower comprising petals composed of twisted and curled flexible strip material, the twisted portions of said material being bound together by windings; its central petal being closely rolled to form a hard pointed heart for the flower.

3. An artificial flower comprising a wire stem bent to form a hook; a continuous flexible strip of material folded upon itself and having the plies of the fold inserted between the limbs of the hook; the strip being thence twisted to form the neck of the flower and outwardly curled edges to form the edges of petals; and windings holding the several twists of the continuous strip in place to form the neck and the curls at the edges; said curls serving to hold the petals in shape.

4. An artificial flower comprising a wire stem bent to form a hook; a flexible strip of one color of material folded diagonally upon itself, and the plies of the fold inserted in the hook; the strip being thence twisted to form the neck of the flower, and having curled edges to form the edges of petals; windings holding the several twists in place to form the neck and the curls at the edges; said curls serving to hold the petals in shape; and an additional strip of another color likewise twisted and curled and bound to form outside and encasing petals.

5. A flower comprising a ribbon and a wire stem and having a heart that comprises a fold formed of plies resulting from folding the end of the ribbon diagonally lengthwise; the two plies of the fold, together forming a nucleus for the heart; adjacent portions of the ribbon being wound around such nucleus and twisted around the wire with the folded edge of the diagonal fold bent away from the wire and then drawn in to a narrow neck at the wire, and a thread tightly wound around the neck; the ribbon being thence bent up and there forming the start of the first petal around the heart and then twisted outwardly in a curl of the selvage edge of the ribbon, outwardly from the heart and forming a roll at the outer edge of the petal; said ribbon being then finished with a twist so that the petal has a permanent outward curl at the edge of the petal.

In testimony whereof, I have hereunto set my hand at Long Beach, California, this 18th day of May, 1928.

ANNA M. PATTERSON.